Jan. 13, 1925.  
L. CZAKÓ  
1,523,056  
FILM MENDING MACHINE  
Filed Feb. 20, 1922   2 Sheets-Sheet 1
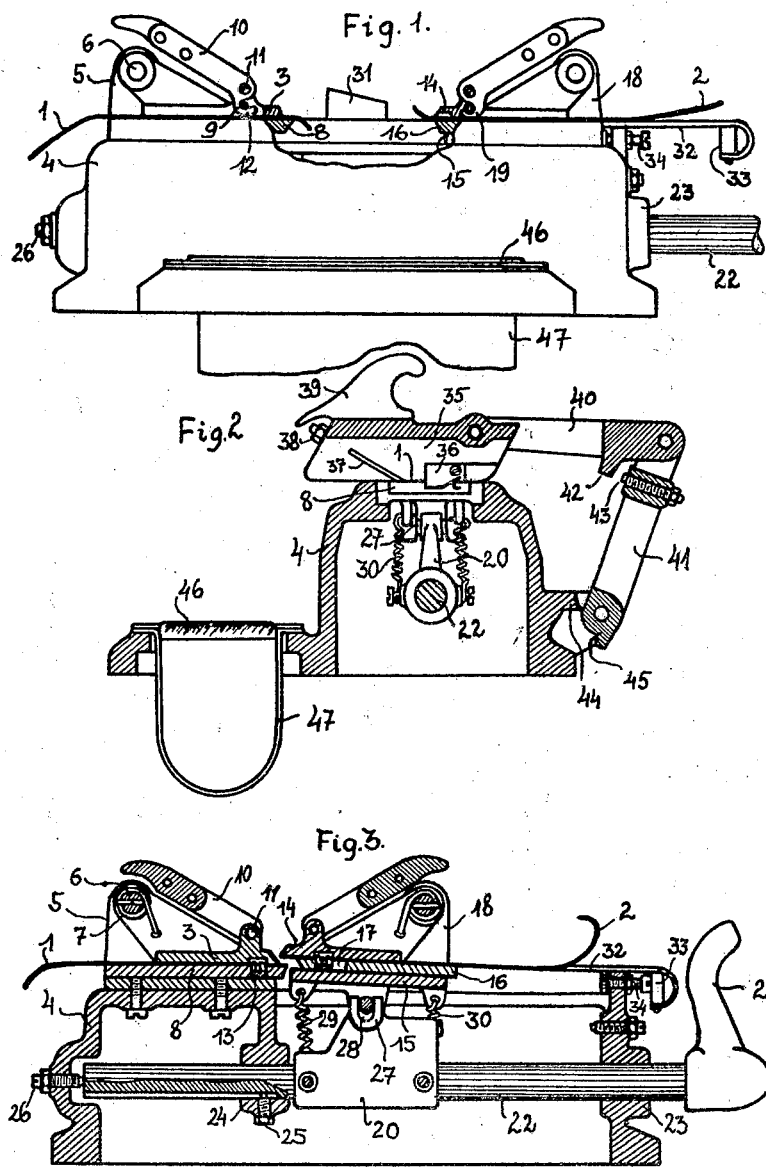

Jan. 13, 1925.
L. CZAKÓ
1,523,056
FILM MENDING MACHINE
Filed Feb. 20, 1922    2 Sheets-Sheet 2
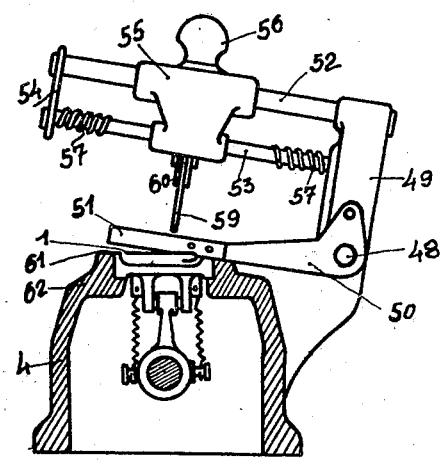
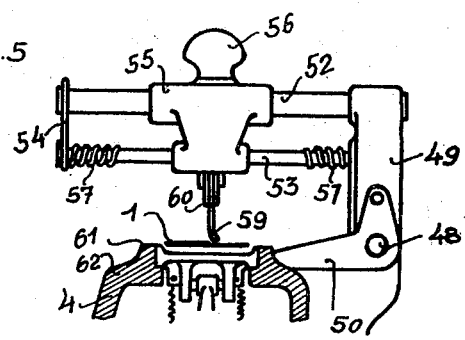
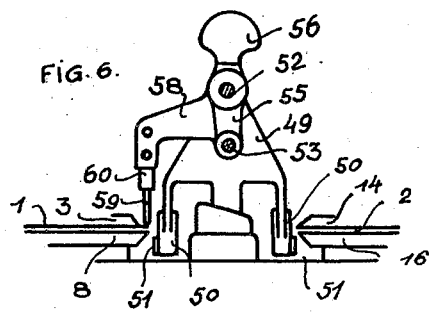

Patented Jan. 13, 1925.

1,523,056

UNITED STATES PATENT OFFICE.

LÁSZLÓ CZAKÓ, OF BUDAPEST, HUNGARY.

FILM-MENDING MACHINE.

Application filed February 20, 1922. Serial No. 538,135.

*To all whom it may concern:*

Be it known that I, LÁSZLÓ CZAKÓ, the owner of the firm "Correxworks manufactory of machines for the film industry László Czakó," of Budapest IV, Koronaherceg u. 2, in the State Hungary, a subject of the Kingdom Hungary, and resident of Budapest, in the State Hungary (whose postoffice address is Budapest, Hungary, IV, Koronaherceg utca 2), have invented certain new and useful Improvements in Film-Mending Machines, of which the following is a specification.

The present invention relates to apparatus for use in joining together lengths of photographic or cinematograph film. The object of the invention is to provide improved apparatus of the kind which is simple in construction and efficient in operation. An embodiment of the invention is shown in the accompanying drawings in which Fig. 1 represents in side elevation (partly in section) the initial position of the parts prior to the joining of the ends of two films, Fig. 2 showing a cross section during the stroke of the scraping tool, while Fig. 3 is a longitudinal section of the apparatus shortly before the advancing clamp reaches its terminal position. Figs. 4, 5 and 6, represent modified details of means for trimming and preparing the edges to be joined, Fig. 4 showing a cross section of the apparatus during the trimming off of the ends of the films, while Figs. 5 and 6 show respectively a cross section and longitudinal section during the scraping operation.

Referring to Figs. 1, 2 and 3, the ends of the two lengths of film, 1, 2 which are to be joined together, are each gripped in a clamp, the clamp on the left hand side being stationary, whereas that on the right can be moved towards and from the other, in the longitudinal direction of the film. The upper jaw 3 of the stationary clamp is hinged at 6 on a bracket 5 on the machine frame 4, and is provided with pressure springs 7 (Fig. 3). The lower jaw 8 of the clamp projects beyond the upper jaw after the manner of a lip. The two jaws 3 and 8, together with the end of the strip of film 1 to be clamped, are held firmly by hook levers 9, adapted to be swung round pivots 11 on the upper jaw 3, by means of a handle 10, the hook engaging a pin 12 on the lower jaw 8. The latter jaw is provided with teeth 13 which fit into the lateral perforations of the film in order to adjust the position of the film properly (Fig. 3).

The upper jaw 14 of the movable clamp is operated in a similar manner, whereas the lower jaw consists of two plates 15, 16. The plate 16 is arranged between 14 and 15 and is adapted to move longitudinally relatively to the upper jaw 14. The plate 15 being provided with adjusting teeth and having its front edge projecting beyond the edge of the plate 16. The plate 16 is slotted at 17, in the sphere of action of the teeth, so as to enable it to be moved without affecting the adjustment of the film. In this case the pin 19 and bracket 18 form part of the relatively fixed lower plate 15.

The movable clamp is mounted on a carriage 20 which is secured on a rod 22, provided with a handle 21 and guided in bearings 23, 24 on the frame of the machine. A threaded pin 25 engages in a longitudinal groove in the rod 22 and prevents the same from turning round. The stroke of the feed rod is limited by an adjustable stop 26.

The lower plate 15 of the movable clamp is pivoted to the carriage 20 at 27, and is guided vertically in the carriage by means of a fork like bearing 28. This plate 15 is connected to the carriage 20 by means of tension springs 29, 30 (Figs. 2 and 3).

On one side of the path traversed by the movable clamp is a guide plate 31 (Fig. 1) which slopes upwards gradually towards the left and terminates in a sheer edge. The lower plate 15 of the movable clamp is provided with a pin or the like (not shown in the drawing), which rides on the guide plate 31 as the clamp advances and raises the movable clamp against the pull of the springs 29, 30. On reaching the edge of the sheer side, the movable clamp drops down on to the fixed clamp aided by the springs 29, 30.

The intermediate tongue 16 is provided with a tail piece 32, the head 33 of which strikes against a screw 34 when the movable clamp is moved forward a certain distance (Fig. 3) and retains the tongue 16 in a rearward position in relation to the other members of the clamp, which continue to advance.

A plane 35 (Fig. 2) is adapted to travel across the path of the clamp, and is provided with two film-cutter blades 36, spaced apart a distance equal to the distance between the clamp edges, and behind one of these blades, a scraper 37 is arranged. The cutters 36 co-act with the inner front edges of the clamp jaws, in the initial position of the clamps as shown in Fig. 1, and cut off the projecting ends of the strips of film, 1, 2. The scraper 37, which can be adjusted by means of the nut 38, slides over the end of the film on the projecting lip of the lower jaw 8, when the plane is moved across the machine. By means of the handle 39, the plane 35 can be turned completely out of the way of the clamps, until its movement is arrested by the stops 42, 43 and 44, 45 on the pivoted arms 40, 41 and machine frame 4, coming into contact.

The above-described machine operates as follows:—

The strips of film 1, 2 are placed on the plates 8 and 15 respectively with their coated sides upwards, the teeth 13, 17 engaging the perforations in the edges of the strips, and the strips are clamped so that the line along which each is to be cut registers with the inner edge of the clamp jaws, the portion intended for the overlap being left exposed between the jaw 3 and lip of the fixed clamp 8. The clamps being in the position shown in Fig. 1, the plane 35 is put into action and moved across until arrested by the aforesaid stops. During this stroke of the plane, the ends of the films are trimmed off, and the emulsion is scraped off the portion of films lying on the projection lip of the fixed clamp 8 by the scraper 37, which acts like a plane. The left hand overlap film thus denuded of emulsion is then coated with an adhesive and the rod 22 is pushed forward carrying the movable clamp with it. During this stroke, the sloping guide plate 31 raises the movable clamp, whilst the stops 33, 34 hold the tongue 16 back so as to expose a strip of overlap film on the underside of the clamp member 14. Finally, the movable clamp drops down on to the fixed one, the overlaps rest one over the other and are held firmly together by the action of the springs 29, 30. The width of the overlap can be regulated by adjusting the stops at 33, 34 and 26.

The drawing shows, in addition, a lamp housing 47, arranged in the machine frame and covered by a glass plate 46. The strip of film is passed over the glass plate and examined by the light transmitted from below.

According to the modification shown in Figs. 4, 5 and 6 a rocking arm 49, pivoting on pins 48, is provided on the machine frame 4, and carries two cutter blades 51 secured to arms 50. These blades take the place of the cutters 36 of Fig. 2, and shear off the ends of film projecting from the clamp jaws 3, 8 and 14, 16 respectively. The arm 49 is provided with two spindles 52, 53 connected together at their outer ends by a plate 54. Along these spindles travels the plane carrier 55 operated by the handle 56, the stroke of the plane in either direction being limited by the springs 57.

On a bracket 58 (Fig. 6) on the carrier 55 is mounted a thin strip of steel 59, which is of such length that, in the working position, its end bends and drags over the exposed overlap of film 1 (Fig. 5). This strip is mounted between two guard strips 60.

The method of working is the same as in the embodiment already described, with the exception that, in the present case, the cutters 51 have a shearing action.

In the operating path of the scraper 59, the frame 4 of the machine slopes sharply from the face 61, which is flush with the surface of the film, down to the shoulder 62, so that, when the scraper reaches the end of its stroke, its bent tip straightens out suddenly on passing the edge 61 and flings the scrapings of emulsion out of the way. The strip of emulsion to be scraped off is preferably softened beforehand with a little water.

The elasticity of the tip of the steel strip 59 enables it to scrape off the emulsion cleanly even when the coating is uneven, without damaging the material of the film itself.

Although I have illustrated and described only two forms of the invention, I am aware of the fact that many modifications can be made therein by any person skilled in the art without departing from the scope of the invention as expressed in the claims.

Therefore I do not wish to be limited to all the details of the construction shown in either of the forms, but what I do claim is:

1. In an apparatus for use in joining together strips of photographic film with two clamps for the ends of the film to be joined, one of the clamps being fixed and the other movable, the latter comprising three parts, an upper and a lower part relatively, stationary and an intermediate part movable relatively to the other parts.

2. In an apparatus for use in joining together strips of photographic film with two clamps for the ends of the film to be joined, one of the clamps being fixed and the other movable, the latter comprising three parts, an upper and a lower part relatively stationary and an intermediate part movable relatively to the other parts, an inclined plate for raising the movable clamp by advancing towards the fixed clamp and allowing it to drop at the end of its advance movement, the upper jaw falling upon the projecting jaw of the stationary clamp.

3. In an apparatus for use in joining together strips of photographic film with two clamps for the ends of the film to be joined, one of the clamps being fixed and the other movable, the latter comprising three parts, an upper and a lower part relatively stationary and an intermediate part movable relatively to the other parts, the intermediate part of the movable jaw being provided with a rearward projection having a stop for limiting the forward motion of the said intermediate part.

4. In an apparatus for use in joining together strips of photographic film with two clamps for the ends of the film to be joined, one of the clamps being fixed and the other movable, the latter comprising three parts, an upper and a lower part relatively stationary and an intermediate part movable relatively to the other parts, the combination with a flexible scraper, with the under end free springing and with the upper end sliding on a cross plane, and bending by passing over the film and scraping off the emulsion.

5. In an apparatus for use in joining together strips of photographic film with two clamps for the ends of the film to be joined, one of the clamps being fixed and the other movable, the latter comprising three parts, an upper and a lower part relatively stationary and an intermediate part movable relatively to the other parts, the combination with a flexible scraper, with the under end free springing and with the upper end sliding on a cross plane, and bending by passing over the film and scraping off the emulsion, the working length of the flexible scraper surpassing the distance between the said cross plane and the place of the film.

6. In an apparatus for use in joining together strips of photographic film with two clamps for the ends of the film to be joined, one of the clamps being fixed and the other movable, the latter comprising three parts, an upper and a lower part relatively stationary and an intermediate part movable relatively to the other parts, the combination with a flexible scraper, with the under end free springing and with the upper end sliding on a cross plane, and bending by passing over the film and scraping off the emulsion, the working length of the flexible scraper surpassing the distance between the said cross plane and the place of the film; the treating path of the said flexible scraper both sides precipitiously ending relatively to the place of the film.

In testimony that I claim the foregoing as my own, I have hereto affixed my signature in the presence of two witnesses.

Signed at Budapest State of Hungary this 24 day of January 1922.

LÁSZLÓ CZAKÓ.

Witnesses:
  HUGÓ KALMÁR,
  ROBERT LORÁUT.